Figure 1:
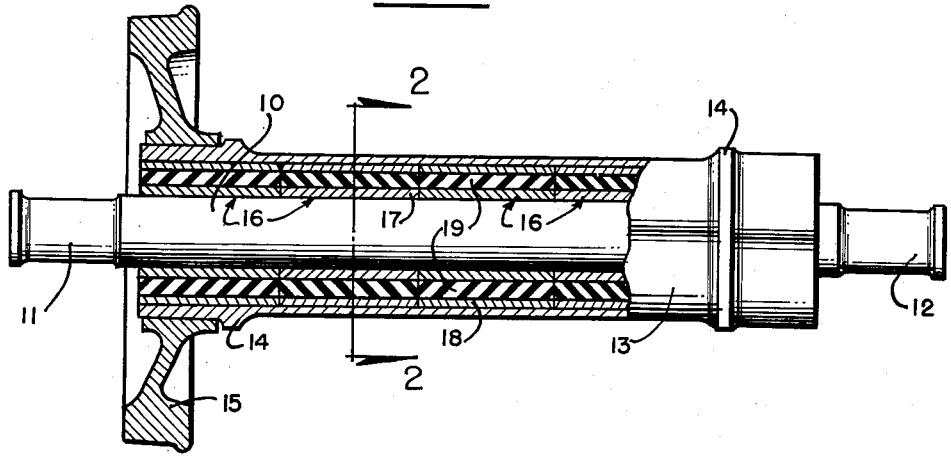

May 29, 1956     W. BLACKWOOD     2,747,918

RAILWAY VEHICLE AXLES

Filed Feb. 12, 1953

INVENTOR

*Wares Blackwood*

United States Patent Office 2,747,918
Patented May 29, 1956

2,747,918

RAILWAY VEHICLE AXLES

Waves Blackwood, Los Angeles, Calif.

Application February 12, 1953, Serial No. 336,618

1 Claim. (Cl. 295—36)

The present invention relates to a railway vehicle axle and it consists in the combinations, constructions and arrangements of parts herein described and claimed.

Generally there is provided a railway vehicle axle comprising a conventional axle having bearing journals at either end portion thereof and provided with a hollow cylindrical outer axle between which and the conventional axle is press fitted a plurality of resilient units each comprising an inner and an outer cylindrical shell formed of metal and having bonded therebetween a cylindrical piece of resilient material such as rubber or the like. The vehicle wheels are press fitted at either end portion of the outer cylindrical axle. The construction is particularly suited for use in connection with railway car trucks.

It is accordingly an object of the invention to provide a novel axle assembly which is simple in construction, relatively inexpensive to manufacture and yet effective and efficient in use.

Another object of the invention is to provide a novel axle assembly having shock-absorbing means incorporated therein.

Another object of the invention is to provide an assembly of the character set forth wherein the pressure per unit area will be uniformly distributed over a large area of resilient material, forming a part of the invention.

Another object of the invention is to provide, in a structure of the character set forth, novel means for preventing distortion, the cushioning of shock loads, the elimination of metal fatigue and breakage to bearings and the like and the elimination to a large degree of necessary maintenance.

Figure 2:
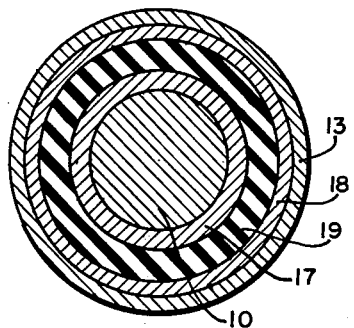
Figure 3:
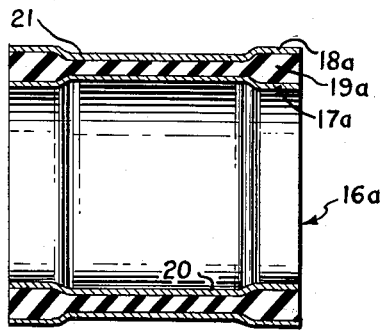

Other and further objects of the invention will become apparent from a reading of the following specification taken in conjunction with the drawing, in which:

Figure 1 is a side elevational view, partly broken away, of an embodiment of the invention, Figure 2 is an enlarged sectional view taken along line 2—2 of Figure 1, and Figure 3 is a vertical longitudinal sectional view of another and preferred form of resilient unit forming a part of the invention.

Referring more particularly to the drawing, there is shown therein a device of the character set forth comprising a conventional axle 10 having bearing journals 11 and 12 formed in the end portions thereof. Surrounding the body of the axle 10 is a hollow cylindrical outer axle 13 provided with an outstanding ridge 14 adjacent each end thereof. Between the ridges 14 and the outer ends of the axle 13 there is press fitted in each case a vehicle wheel 15, one of which is shown at the left-hand side of Figure 1.

Press fitted or otherwise suitably secured between the conventional axle 10 and the outer axle 13 is a plurality of resilient units each generally indicated at 16 and each comprising an inner cylindrical shell 17, an outer cylindrical shell 18 and a cylinder of resilient material 19 composed of rubber or the like. The cylinder 19 is bonded to the outer surface of the shell 17 and to the inner surface of the shell 18 and each unit is press fitted between the axle 10 and axle 13.

In Figure 3 there is shown a preferred embodiment of a resilient unit which is generally indicated at 16a and which comprises an inner shell 17a, an outer shell 18a and an intervening cylinder of rubber or the like 19a. In this form of the invention the main portion of the shell 17a is pressed outwardly, as indicated at 20 while the main portion of the shell 18a is pressed inwardly as indicated at 21 leaving the walls distorted as shown in the figure. In the form of the invention shown in Figure 3 it will be seen that the rubber 19a is compressed between the metal surfaces which compression force and the friction between the rubber and the metal provide the mechanical adhesion which is practically indestructible. If desired, one of the yieldable cylindrical units may be disposed at each end of the axle assembly and other units allowed to loosely float on the axle between them.

In operation, it will be apparent that the load and any shocks moving toward or away from the conventional axle 10 will be absorbed to a large degree by the rubber cylinders 19 or 19a as the case may be and that the load will be more evenly distributed than in the conventional axle structures.

It will be readily apparent to those skilled in the art that many minor modifications may be made without departing from the spirit of the invention or the scope of the appended claim.

What is claimed is:

A railway vehicle axle assembly comprising an axle having bearing journals on the respective opposite ends thereof, a hollow cylindrical outer axle having respectively at the opposite ends thereof end portions with ridges of annular form and serving as abutments, a vehicle wheel press fitted on at least one of the end portions and the other end portion adapted to correspondingly receive a vehicle wheel, a plurality of resilient cylindrical members extending throughout the length of the outer axle and between the inner and outer axles, each of the resilient members comprising an inner metal shell, an outer metal shell and an intervening cylinder of rubber, said inner shell having a radially outwardly pressed portion, said outer shell having a radially inwardly pressed portion, whereby said rubber will be compressed between the metal shells so that the friction between the rubber and the metal is sufficient to hold the shells and the rubber in assembled relationship, whereby any shocks will be taken away from the inner axle and will be absorbed to a large degree by the rubber resilient members and the load will be more evenly distributed throughout the axle than with the conventional structures.

References Cited in the file of this patent

UNITED STATES PATENTS

| Number | Name | Date |
|---|---|---|
| 293,201 | Stewart | Feb. 5, 1884 |
| 1,827,268 | Short | Oct. 13, 1931 |
| 2,051,864 | Knox et al. | Aug. 25, 1936 |
| 2,233,191 | Arcier et al. | Feb. 25, 1941 |
| 2,362,008 | Hile | Nov. 7, 1944 |
| 2,436,681 | Swenson | Feb. 24, 1948 |
| 2,522,350 | Ditter | Sept. 12, 1950 |
| 2,609,194 | Krotz | Sept. 2, 1952 |